United States Patent
Sano et al.

(10) Patent No.: US 8,431,630 B2
(45) Date of Patent: Apr. 30, 2013

(54) METHOD FOR MANUFACTURING WATER RESISTANT ALUMINUM PIGMENT DISPERSION, WATER RESISTANT ALUMINUM PIGMENT, AND AQUEOUS INK COMPOSITION CONTAINING THE SAME

(75) Inventors: Tsuyoshi Sano, Shiojiri (JP); Takayoshi Kagata, Shiojiri (JP)

(73) Assignee: Seiko Epson Corporation (JP)

( * ) Notice: Subject to any disclaimer, the term of this patent is extended or adjusted under 35 U.S.C. 154(b) by 220 days.

(21) Appl. No.: 12/714,656

(22) Filed: Mar. 1, 2010

(65) Prior Publication Data

US 2010/0227961 A1 Sep. 9, 2010

(30) Foreign Application Priority Data

Mar. 5, 2009 (JP) ................. 2009-051648

(51) Int. Cl.
*C09D 11/00* (2006.01)
(52) U.S. Cl.
USPC ............ 523/160; 523/161; 524/441; 241/4
(58) Field of Classification Search .......... 523/160, 523/161
See application file for complete search history.

(56) References Cited

U.S. PATENT DOCUMENTS

| | | | |
|---|---|---|---|
| 6,287,695 | B1 | 9/2001 | Kaupp et al. |
| 6,428,846 | B2 | 8/2002 | Kaupp et al. |
| 7,303,619 | B2 | 12/2007 | Oyanagi |
| 2002/0168484 | A1 | 11/2002 | Kaupp et al. |
| 2004/0173121 | A1* | 9/2004 | Fukuo et al. ............... 106/31.89 |
| 2007/0044684 | A1* | 3/2007 | Nakano et al. ............. 106/31.86 |
| 2008/0145628 | A1 | 6/2008 | Oyanagi et al. |
| 2009/0214833 | A1* | 8/2009 | Oyanagi et al. ........... 428/195.1 |

FOREIGN PATENT DOCUMENTS

| | | |
|---|---|---|
| JP | 10-088026 | 4/1998 |
| JP | 2003-082259 A | 3/2003 |
| JP | 2003-253182 A | 9/2003 |
| JP | 2005-068250 A | 3/2005 |
| JP | 2005-068251 A | 3/2005 |
| JP | 2007-169451 A | 7/2007 |
| JP | 2008-174712 A | 7/2008 |
| WO | WO 2006/101054 * | 9/2006 |

OTHER PUBLICATIONS

English Abstract of Japanese Application No. 2003-082259 A Published Mar. 19, 2003.
English Abstract of Japanese Application No. 2003-253182 A Published Sep. 10, 2003.
English Abstract of Japanese Application No. 2005-068250 A Published Mar. 17, 2005.
English Abstract of Japanese Application No. 2005-068251 A Published Mar. 17, 2005.
English Abstract of Japanese Application No. 2007-169451 A Published Jul. 5, 2007.
English Abstract of Japanese Application No. 2008-174712 A Published Jul. 31, 2008.

* cited by examiner

*Primary Examiner* — Doris Lee
(74) *Attorney, Agent, or Firm* — Harness, Dickey & Pierce, P.L.C.

(57) ABSTRACT

A method for manufacturing a water resistant aluminum pigment dispersion includes the steps of: (a) forming a composite pigment base by sequentially laminating a peeling resin layer and an aluminum layer on a sheet-shaped substrate; (b) forming a composite pigment by peeling the sheet-shaped substrate from the composite pigment base; and (c) forming an aluminum pigment dispersion by pulverizing the composite pigment, and in the method described above, at least one of the steps (b) and (c) is performed in an organic solvent to which a phosphorous surfactant is added.

14 Claims, No Drawings

METHOD FOR MANUFACTURING WATER RESISTANT ALUMINUM PIGMENT DISPERSION, WATER RESISTANT ALUMINUM PIGMENT, AND AQUEOUS INK COMPOSITION CONTAINING THE SAME

BACKGROUND

1. Technical Field

The present invention relates to a method for manufacturing a water resistant aluminum pigment dispersion, a water resistant aluminum pigment, and an aqueous ink composition containing the same.

2. Related Art

Heretofore, as a method for forming a coating film having a metallic gloss on a printed material, for example, a method using a printing ink in which a gold powder or a silver powder formed, for example, from a brass or an aluminum fine powder is contained as a pigment, a foil press printing method using a metal foil, or a thermal transfer method using a metal foil may be mentioned.

In recent years, many applications of ink jet techniques have been performed in printing fields, and as one of the applications, metallic printing may be mentioned, so that development of an ink having a metallic gloss has been carried out. For example, in JP-A-2008-174712, an aluminum pigment dispersion containing an organic solvent, such as an alkylene glycol, as a basic component and a non-aqueous ink composition containing the above dispersion have been disclosed.

On the other hand, in views of global environmental conservation, safety for human beings, and the like, instead of a non-aqueous ink composition containing an organic solvent as a basic component, development of an aqueous ink composition has been actually desired.

However, when an aluminum pigment is dispersed in water, it generates a hydrogen gas and also forms alumina by reaction with water, and whitening occurs thereby; hence, as a result, the metallic gloss is disadvantageously degraded. Accordingly an ink composition containing an aluminum pigment must be a composition which hardly contains water and which contains an organic solvent as a basic component.

SUMMARY

An advantage of some aspects of the invention is to provide a method for manufacturing a water resistant aluminum pigment dispersion which prevents whitening when being blended with an aqueous paint or an aqueous ink and which has a superior metallic gloss.

A method for manufacturing a water resistant aluminum pigment dispersion according to the invention comprises the steps of: (a) forming a composite pigment base by sequentially laminating a peeling resin layer and an aluminum layer on a sheet-shaped substrate; (b) forming a composite pigment by peeling the sheet-shaped substrate from the composite pigment base; and (c) forming an aluminum pigment dispersion by pulverizing the composite pigment, and at least one of the steps (b) and (c) is performed in an organic solvent to which a phosphorous surfactant is added.

In the method for manufacturing a water resistant aluminum pigment dispersion according to the invention, at least one of the steps (b) and (c) may comprise performing an ultrasonic treatment in the organic solvent to which a phosphorous surfactant is added.

In the method for manufacturing a water resistant aluminum pigment dispersion according to the invention, at least one of the steps (b) and (c) may comprise immersing at least one of the composite pigment base and the composite pigment in the organic solvent to which a phosphorous surfactant is added.

In the method for manufacturing a water resistant aluminum pigment dispersion according to the invention, the concentration of the phosphorous surfactant in the organic solvent may be 1 to 15 mass percent.

In the method for manufacturing a water resistant aluminum pigment dispersion according to the invention, the phosphorous surfactant may be a phosphate anionic surfactant.

In the method for manufacturing a water resistant aluminum pigment dispersion according to the invention, the organic solvent may be diethylene glycol diethyl ether or triethylene glycol monobutyl ether.

A water resistant aluminum pigment dispersion according to the invention is manufactured by the method for manufacturing a water resistant aluminum pigment dispersion described above.

In the water resistant aluminum pigment dispersion according to the invention, the aluminum pigment dispersion includes an aluminum pigment in the form of plate-shaped particles, and when the long diameter, the short diameter, and the thickness of a plain surface of each of the plate-shaped particles are represented by X, Y, and Z, respectively, a 50% average particle diameter R50 of a corresponding circle which is obtained by calculation from the areas of X-Y plain surfaces of the plate-shaped particles is in the range of 0.5 to 3 and R50/Z>5 is satisfied.

An aqueous ink composition according to the invention comprises the water resistant aluminum pigment dispersion described above.

DESCRIPTION OF EXEMPLARY EMBODIMENTS

Hereinafter, preferred embodiments of the invention will be described in detail; however, the invention is not limited thereto.

1. A METHOD FOR MANUFACTURING A WATER RESISTANT ALUMINUM PIGMENT DISPERSION

A method for manufacturing a water resistant aluminum pigment dispersion according to one embodiment of the invention comprises the steps of: (a) forming a composite pigment base by sequentially laminating a peeling resin layer and an aluminum layer on a sheet-shaped substrate; (b) forming a composite pigment by peeling the sheet-shaped substrate from the composite pigment base; and (c) forming an aluminum pigment dispersion by pulverizing the composite pigment, and in this manufacturing method, at least one of the steps (b) and (c) is performed in an organic solvent to which a phosphorous surfactant is added.

Hereinafter, one example of the method for manufacturing a water resistant aluminum pigment dispersion according to this embodiment will be described.

1.1 Step (a)

First, a sheet-shaped substrate is prepared. For the sheet-shaped substrate, although a material is not particularly limited, for example, there may be mentioned a mold releasing film, such as a polyolefin film of a poly(tetrafluoroethylene), a polyethylene, a polypropylene, or the like, a polyester film of a poly(ethylene terephthalate) or the like, a polyamide film of a nylon 66, a nylon 6, or the like, a polycarbonate film, a triacetate film, or a polyimide film. Among those mentioned above, a film of a poly(ethylene terephthalate) or a copolymer thereof is preferable.

Although the thickness of the sheet-shaped substrate is not particularly limited, it is preferably in the range of 10 to 150 µm. When the thickness is 10 µm or more, handling of the substrate in the steps or the like may not cause any problems, and when the thickness is 150 µm or less, since having sufficient flexibility, the substrate may be, for example, rolled up or peeled away without causing any problems.

Next, a composite pigment base having the structure in which a peeling resin layer and an aluminum layer are sequentially laminated on the sheet-shaped substrate is formed.

The peeling resin layer is an undercoat layer for the aluminum layer and is also a peeling promotion layer to promote the peeling from the sheet-shaped substrate. As a resin used for this peeling resin layer, for example, a poly(vinyl alcohol), a poly(vinyl butyral), a poly(ethylene glycol), a poly(acrylic acid), a poly(acryl amide), a cellulose derivative, or a modified nylon resin is preferable.

When a solution containing at least one of the resins mentioned above by way of example is applied to a recording medium and is then dried, the peeling resin layer can be formed. After the application, an additive, such as a viscosity modifier, may also be added.

The application of the peeling resin layer may be performed by a known technique, such as gravure application, roll application, blade application, extrusion application, dip application, or spin coat application, which has been generally used. After the application and drying, whenever necessary, the surface may be smoothed by a calendering treatment.

Although the thickness of the peeling resin layer is not particularly limited, it is preferably in the range of 0.5 and 50 µm and more preferably in the range of 1 and When the thickness is less than 0.5 the amount is not sufficient as a dispersing resin, and when the thickness is more than 50 µm, peeling is liable to occur at the interface with the aluminum layer when being rolled up therewith.

For the aluminum layer, besides an aluminum element, an aluminum alloy may also be used. When an aluminum alloy is used, as a metal element or a non-metal element which can be added to aluminum, any element may be used as long as it functions to exhibit a metallic gloss or the like. However, for example, silver, gold, platinum, nickel, chromium, tin, zinc, indium, titanium, or copper may be mentioned, and one of the aforementioned elements or at least one of alloys and mixtures thereof is preferably used.

As a method for laminating the aluminum layer, a vacuum deposition, an ion plating, or a sputtering method is preferably used.

The aluminum film is formed so as to have a thickness in the range of 20 to 100 nm. Accordingly, an aluminum pigment having an average thickness in the range of 20 to 100 nm is obtained. When the thickness is set to 20 nm or more, the reflectivity and the brightness are superior, and the characteristics as the aluminum pigment are improved. In addition, when the thickness is set to 100 nm or less, an increase in apparent specific gravity is suppressed, and hence dispersion stability of the aluminum pigment can be ensured.

In addition, as exemplified in JP-A-2005-68250, the aluminum layer may be sandwiched by protective layers. As the protective layer, for example, a silicon oxide layer or a protective resin layer may be mentioned.

The silicon oxide layer is not particularly limited as long as it contains silicon oxide but is preferably formed by a sol-gel method from a silicon alkoxide, such as a tetraalkoxysilane, or a polymer thereof. When an alcohol solution dissolving a silicon alkoxide or a polymer thereof is applied and is then fired by heating, a coating film of a silicon oxide layer is formed.

For the protective resin layer, any resin may be used as long as it is not dissolved in a dispersion medium, and for example, a poly(vinyl alcohol), a poly(ethylene glycol), a poly(acrylic acid), a poly(acryl amide), or a cellulose derivative may be mentioned. Among those mentioned above, a poly(vinyl alcohol) or a cellulose derivative is preferably used.

When an aqueous solution containing at least one of the resins mentioned above by way of example is applied and is then dried, the protective resin layer can be formed. After the application, an additive, such as a viscosity modifier, may be added. The application of the silicon oxide and the resin is performed by a method similar to that for the application of the peeling resin layer.

The thickness of the protective layer is not particularly limited but is preferably in the range of 50 to 150 nm. When the thickness is less than 50 nm, the mechanical strength is not sufficient, and when the thickness is more than 150 nm, since the strength is excessively increased, pulverization/dispersion cannot be easily performed, so that peeling may occur at the interface with the aluminum layer in some cases.

In addition, as exemplified in JP-A-2005-68251, a coloring layer may be provided between the "protective layer" and the "aluminum layer".

The coloring layer is provided to obtain an optional color composite pigment and is not particularly limited as long as it contains a coloring material which can impart optional color tone and hue in addition to the metallic gloss, brightness, and background masking properties of the aluminum pigment used in this embodiment. As the coloring material used for this coloring layer, either a dye or a pigment may be used. In addition, as the dye or the pigment, a known material may be appropriately used.

In this case, the "pigment" used for the coloring layer indicates a natural pigment, a synthetic organic pigment, a synthetic inorganic pigment, or the like which is defined in general engineering fields.

A method for forming the coloring layer is not particularly limited, but the coloring layer is preferably formed by coating. In addition, when the coloring material used for the coloring layer is a pigment, a coloring-material dispersion resin is preferably further contained. When the coloring-material dispersion resin is used, a resin thin film is preferably formed in such a way that after the pigment, the coloring-material dispersion resin, and whenever necessary, other additives or the like are dispersed or dissolved in a solvent to form a solution, a uniform liquid film is formed by spin coating of this solution, and drying is then performed. In addition, in the method for manufacturing a composite pigment base, the coloring layer and the protective layer are preferably both formed by coating in view of working efficiency.

The composite pigment base may also has a layer structure which includes a plurality of sequential lamination structures in each of which the peeling resin layer and the aluminum layer are sequentially laminated. In this case, the total thickness of the lamination structures including a plurality of aluminum layers, that is, the thickness of the aluminum layer-peeling resin layer-aluminum layer, which is obtained by removing the sheet-shaped substrate and the peeling resin layer provided immediately thereon, or the thickness of the peeling resin layer-aluminum layer is preferably 5,000 nm or less. When the thickness is 5,000 nm or less, even if the composite pigment base is wound in the form of a roll, cracking and peeling are not likely to occur, and the storage stability is superior. In addition, when the composite pigment base is formed into a pigment, it is preferable since the metallic gloss is excellent. Although a structure in which the peeling resin layers and the aluminum layers are sequentially laminated on two surfaces of the sheet-shaped substrate may also be mentioned by way of example, the structure is not limited to those described above.

1.2 Step (b)

Next, the sheet-shaped substrate is peeled away from the composite pigment base obtained in the step (a) to form a composite pigment. Although a method for peeling the sheet-shaped substrate from the composite pigment base is not particularly limited, a method in which the composite pigment base is immersed in an organic solvent to which a phosphorous surfactant is added or a method in which an ultrasonic treatment is performed simultaneously when the composite pigment base is immersed in an organic solvent to which a phosphorous surfactant is added is preferable. When a peeling treatment is performed in an organic solvent to which a phosphorous surfactant is added, the water resistance is not only imparted to the composite pigment, but also an effect of preserving a metallic gloss of the aluminum layer can be obtained. When at least one of this step (b) and the step (c) which will be described later is performed in an organic solvent to which a phosphorous surfactant is added, the effect of the invention can be obtained. Hence, when the following step (c) is performed in an organic solvent to which a phosphorous surfactant is added, this step (b) may be performed in an organic solvent to which no phosphorous surfactant is added.

As the phosphorous surfactant, a phosphate anionic surfactant is preferable. As the phosphate anionic surfactant, for example, (di)polyoxyethylene alkyl (C10 to C16) ether phosphate, (di)polyoxyethylene alkyl (C10 to C16) ether phosphate monoethanolamine, or (di)polyoxyethylene styrenated phenyl ether phosphate may be mentioned. Among those mentioned above, (di)polyoxyethylene lauryl ether phosphate monoethanolamine in which the number of carbon atoms of the alkyl chain is 12 is preferable.

As a commercially available (di)polyoxyethylene alkyl (C10 to C16) ether phosphate, for example, "Plysurf A-208B (C12)" or "Plysurf A-210D (C10)" (both manufactured by Dai-ichi Kogyo Seiyaku Co., Ltd.) may be mentioned.

As a commercially available (di)polyoxyethylene alkyl (C10 to C16) ether phosphate monoethanolamine, for example, "Plysurf M-208B (C12)" (manufactured by Dai-ichi Kogyo Seiyaku Co., Ltd.) may be mentioned.

As a commercially available (di)polyoxyethylene styrenated phenyl ether phosphate, for example, "Plysurf AL" (manufactured by Dai-ichi Kogyo Seiyaku Co., Ltd.) may be mentioned.

The HLB value of the phosphorous surfactant is 3 to 20, preferably 8 or more, and more preferably 13 or more.

As the organic solvent, any solvent having superior compatibility with the above phosphorous surfactant without degrading the dispersion stability of the aluminum pigment may be used, but a polar organic solvent is preferable. As the polar organic solvent, for example, alcohols (methyl alcohol, ethyl alcohol, propyl alcohol, butyl alcohol, isopropyl alcohol, fluorinated alcohols, and the like), ketones (acetone, methyl ethyl ketone, cyclohexanone, and the like), carboxylic acid esters (methyl acetate, ethyl acetate, propyl acetate, butyl acetate, methyl propionate, ethyl propionate, and the like), and ethers (diethyl ether, dipropyl ether, tetrahydrofuran, dioxane, and the like) may be mentioned.

Among the polar organic solvents mentioned above by way of example, an alkylene glycol monoether or an alkylene glycol diether which is liquid at ordinary temperature and pressure is more preferable.

As the alkylene glycol monoether, for example, ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, or dipropylene glycol monoethyl ether may be mentioned.

As the alkylene glycol diether, for example, ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, or dipropylene glycol diethyl ether may be mentioned.

Among those mentioned above, since being superior in compatibility with the phosphorous surfactant, triethylene glycol monobutyl ether or diethylene glycol diethyl ether is more preferable. In addition, since preserving the gloss of the aluminum pigment and imparting the water resistance thereto, diethylene glycol diethyl ether is particularly preferable.

The concentration of the phosphorous surfactant contained in the organic solvent to which a phosphorous surfactant is added is preferably 1 to 15 mass percent, more preferably 5 to 15 mass percent, and particularly preferably 5 to 10 mass percent. When the concentration of the phosphorous surfactant is less than the range described above, the effect of imparting the water resistance to the aluminum pigment is not sufficient, and as a result, the aluminum pigment tends to be whitened with time. On the other hand, when the concentration of the phosphorous surfactant is more than the range described above, the metallic gloss of the aluminum pigment is degraded, and the water resistance also tends to be degraded.

1.3 Step (c)

Next, the composite pigment obtained in the step (b) is pulverized to form an aluminum pigment dispersion. Although a method for forming an aluminum pigment dispersion by pulverizing the composite pigment is not particularly limited, a method in which the composite pigment is immersed in an organic solvent to which a phosphorous surfactant is added or a method in which an ultrasonic treatment is performed simultaneously when the composite pigment is immersed in an organic solvent to which a phosphorous surfactant is added is preferable. When a pulverizing treatment is performed in an organic solvent to which a phosphorous surfactant is added, the water resistance is not only imparted to the pulverized aluminum pigment, but also an effect of preserving a metallic gloss thereof can be obtained. When at least one of the step (b) described above and this step (c) is performed in an organic solvent to which a phosphorous surfactant is added, the effect of the invention can be obtained. Hence, when the step (b) described above is performed in an organic solvent to which a phosphorous surfactant is added, this step (c) may be performed in an organic solvent to which no phosphorous surfactant is added. As the organic solvent to which a phosphorous surfactant is added, the same as that described in the above step (b) may be used.

Since the aluminum pigment dispersion obtained by the steps described above contains coarse and large particles, the coarse and large particles are removed by filtration, so that an aluminum pigment dispersion containing an aluminum pigment which has uniform particle diameters can be obtained.

2. WATER RESISTANT ALUMINUM PIGMENT

A water resistant aluminum pigment according to this embodiment is a pigment obtained through the manufacturing steps described above. Since the water resistant aluminum pigment obtained through the above steps is imparted with sufficient water resistance, even when it is dispersed in water, reaction is not likely to occur in which a hydrogen gas is generated in combination with water and whitening occurs due to the formation of alumina. In addition, the aluminum pigment dispersion which is dispersed in water has a mirror surface gloss such that an object reflected in the water can be clearly recognized.

The aluminum pigment in the aluminum pigment dispersion obtained by the steps described above is in the form of plate-shaped particles, and when the long diameter and the short diameter on the plain surface of each plate-shaped particle are represented by X and Y, respectively, and the thickness thereof is represented by Z, a 50% average particle diameter R50, which is the diameter of a corresponding circle obtained by calculation from the areas of X-Y plain surfaces of the plate-shaped particles, is in the range of 0.5 and 3 and R50/Z>5 is also satisfied.

In this case, the "plate-shaped particles" indicate particles each having an approximately flat surface (X-Y plain surface) and an approximately uniform thickness (Z). Since the plate-shaped particles are formed by pulverizing an aluminum deposition film, aluminum particles each having an approximately flat surface and an approximately uniform thickness can be obtained. Hence, the long diameter, the short diameter, and the thickness of each of the plate-shaped particles can be defined by X, Y, and Z, respectively.

The "diameter of a corresponding circle" is the diameter of a circle which is assumed to have the same projection area as the projection area of an aluminum particle having an approximately flat surface (X-Y plain surface). For example, when an approximately flat surface (X-Y plain surface) of an aluminum particle has a polygonal shape, a circle having the same projection area as that of the polygonal shape is assumed, and the diameter of this circle is the "diameter of a corresponding circle of this aluminum particle".

In order to ensure a superior metallic gloss and printing stability, the 50% average particle diameter of a corresponding circle obtained by calculation from the areas of the approximately flat surfaces (X-Y plain surfaces) of the plate-shaped particles is preferably in the range of 0.5 to 3 μm and more preferably in the range of 0.75 to 2 μm. When the R50 is less than 0.5 μm, the metallic gloss may not be sufficient in some cases. On the other hand, when the R50 is more than 3 μm, the printing stability may be degraded in some cases.

In addition, according to the relationship between the 50% average particle diameter R50 of a corresponding circle and the thickness Z, in order to ensure a metallic gloss, R50/Z>5 must be satisfied. When R50/Z is 5 or less, the metallic gloss is disadvantageously insufficient.

The maximum particle diameter of a corresponding circle obtained by calculation from the areas of approximately flat surfaces (X-Y plain surfaces) of the plate-shaped particles is preferably 10 μm or less. When the maximum particle diameter is set to 10 μm or less, nozzles of an ink jet recording apparatus, foreign-substance removing filters provided in ink flow paths, and the like are prevented from being clogged with the plate-shaped particles.

The long diameter X and the short diameter Y on the plain surface of each of the plate-shaped particles can be measured by a particle image analyzer. As the particle image analyzer, for example, a flow type particle image analyzer FPIA-2100, FPIA-3000, or FPIA-3000S (manufactured by Sysmex Corporation) may be mentioned.

The particle size distribution (CV value) of the plate-shaped particles can be obtained by the following equation (1).

$$CV \text{ value} = (\text{Standard deviation of particle size distribution/average particle diameter}) \times 100 \quad (1)$$

The CV value thus obtained is preferably 60 or less, more preferably 50 or less, and particularly preferably 40 or less. When plate-shaped particles having a CV value of 60 or less are selected, superior printing stability can be obtained.

In addition, in the aluminum pigment dispersion obtained by the steps described above, since the peeling resin layer functions as protective colloid, a stable dispersion can be formed only by performing a pulverizing treatment in an organic solvent. In addition, in an aqueous ink composition using the above pigment, a resin derived from the peeling resin layer also functions to improve adhesion properties of the ink to a recording medium such as paper.

3. AQUEOUS INK COMPOSITION

An aqueous ink composition according to this embodiment includes an aluminum pigment dispersion manufactured by the above method for manufacturing a water resistant aluminum pigment dispersion. In this specification, the "aqueous ink composition" indicates an ink composition containing 70 mass percent or more of water as a solvent. As the water, pure water or ultrapure water, such as ion exchange water, ultrafiltration water, reverse osmosis water, or distilled water, is preferably used. In particular, water obtained by sterilizing the water mentioned above by ultraviolet radiation or addition of hydrogen peroxide is preferable since generation of fungi and bacteria can be suppressed for a long period of time.

The concentration of an aluminum pigment in the aqueous ink composition according to this embodiment is, with respect to the total mass of the aqueous ink composition, preferably 0.1 to 3.0 mass percent, more preferably 0.25 to 2.5 mass percent, and particularly preferably 0.5 to 2.0 mass percent.

The aqueous ink composition according to this embodiment may contains, whenever necessary, an organic solvent, a resin derivative, a surfactant, a polyalcohol, an antioxidant, an UV absorber, a pH adjuster, and the like.

The viscosity of the aqueous ink composition according to this embodiment at 20° C. is preferably 2 to 10 mPa·s and more preferably 3 to 5 mPa·s. When the viscosity of the aqueous ink composition at 20° C. is within the range described above, since the aqueous ink composition is more suitable to an ink jet recording apparatus, an appropriate amount of the composition is ejected from each nozzle, and trajectory deviation and/or splashing of the composition can be further suppressed.

4. EXAMPLES

4.1 Example 1

A resin-layer coating liquid containing 3.0 mass percent of cellulose acetate butyrate (butylation rate: 35% to 39%, manufactured by Kanto Chemical Co., Inc.) and 97 mass percent of diethylene glycol diethyl ether (manufactured by Nippon Nyukazai Co., Ltd.) was uniformly applied to a PET film having a thickness of 100 μm by a bar-coating method and was then dried at 60° C. for 10 minutes, so that a resin layer thin film was formed on the PET film.

Next, an aluminum deposition layer having an average film thickness of 20 nm was formed on the above resin layer using a vacuum deposition apparatus ("VE-1010 type vacuum deposition apparatus" manufactured by Vacuum Device Inc.).

Next, the laminate formed by the method described above was simultaneously processed by peeling, particularization, and dispersion treatments using ultrasonic dispersion apparatus VS-150 (manufactured by AS ONE Corporation) in diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, and an aluminum pigment dispersion was obtained when a cumulative ultrasonic dispersion time was 12 hours.

The aluminum pigment dispersion thus obtained was processed by a filtration treatment using a SUS mesh filter with 5-μm openings, so that coarse and large particles were removed. Next, the filtrate was received in a round-bottom flask, and diethylene glycol diethyl ether was distilled out using a rotary evaporator. After the aluminum pigment dispersion was concentrated by the above step, the concentration of the aluminum pigment dispersion thus concentrated was adjusted, so that an aluminum pigment dispersion A containing 5 mass percent of polyoxyethylene lauryl ether phosphate monoethanolamine was obtained.

4.2 Example 2

An aluminum pigment dispersion B was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 10 mass percent was used.

4.3 Example 3

An aluminum pigment dispersion C was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 15 mass percent was used.

4.4 Example 4

An aluminum pigment dispersion D was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 1 mass percent was used.

4.5 Example 5

An aluminum pigment dispersion E was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene lauryl ether phosphate (sold under the trade name "Plysurf A-208B" manufactured by Dai-ichi Kogyo Seiyaku Co., Ltd.) was added so as to have a concentration of 5 mass percent was used.

4.6 Example 6

An aluminum pigment dispersion F was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene alkyl(C10) ether phosphate (sold under the trade name "Plysurf A-210D" manufactured by Dai-ichi Kogyo Seiyaku Co., Ltd.) was added so as to have a concentration of 5 mass percent was used.

4.7 Example 7

An aluminum pigment dispersion G was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene styrenated phenyl ether phosphate (sold under the trade name "Plysurf AL" manufactured by Dai-ichi Kogyo Seiyaku Co., Ltd.) was added so as to have a concentration of 5 mass percent was used.

4.8 Comparative Example 1

An aluminum pigment dispersion H was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyvinylpyrrolidone (sold under the trade name "Pitzcol K-30L" manufactured by Dai-ichi Kogyo Seiyaku Co., Ltd.) was added so as to have a concentration of 5 mass percent was used.

4.9 Comparative Example 2

An aluminum pigment dispersion I was obtained in a manner similar to that of Example 1 except that instead of diethylene glycol diethyl ether to which polyoxyethylene lauryl ether phosphate monoethanolamine (sold under the trade name "Plysurf M-208B" manufactured by Dai-ichi Kogyo Seiyaku Co., Ltd.) was added so as to have a concentration of 5 mass percent, diethylene glycol diethyl ether to which polyoxyethylene isotridecyl ether (sold under the trade name "Noigen TDS-80" manufactured by Dai-ichi Kogyo Seiyaku Co., Ltd.) was added so as to have a concentration of 5 mass percent was used.

4.10 Evaluation Test 4.10.1 Water Resistance Evaluation Test

One of the aluminum pigment dispersions A to I obtained by the steps described above was dripped into water so as to have a concentration of 1 mass percent and was held at a constant temperature of 25° C. The change with time was observed by visual inspection, so that the water resistance of the aluminum pigment dispersion was evaluated. The evaluation criteria of the water resistance of the aluminum pigment dispersion were as follows.
AA: No whitening is observed for 30 days or more.
A: Whitening is observed between 15 to 29 days.
B: Whitening is observed between 5 to 14 days.
C: Whitening is observed within 4 days.

4.10.2 Gloss Evaluation Test

One of the aluminum pigment dispersions A to I obtained by the steps described above was dripped into water so as to have a concentration of 1 mass percent. The solution thus prepared was dripped and applied to printing paper ("PM photo paper (gloss) model No.: KA450PSK", manufactured by Seiko Epson Corporation), followed by drying at room temperature for 1 day. The sample thus obtained was observed by visual inspection, so that the gloss of the aluminum pigment dispersion was evaluated. The evaluation criteria of the gloss of the aluminum pigment were as follows.

AA: Mirror surface gloss (object reflected in the surface is clearly recognized, and sharpness is obtained.)
A: Gloss (metallic gloss feeling is obtained, but sharpness is not obtained.)
B: Matte feeling (matte metallic gloss is obtained.)
C: Gray feeling (metallic gloss is not obtained and is observed as a gray color.)

4.10.3 Evaluation Results

In Table 1, the evaluation results of the water resistance and the gloss of the aluminum pigment dispersions A to I obtained by the steps described above are shown.

TABLE 1

|  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|
| Type of aluminum pigment dispersion |  | A | B | C | D | E | F | G | H | I |
| Surfactant | Plysurf M-208B | 5 | 10 | 15 | 1 |  |  |  |  |  |
|  | Plysurf A-208B |  |  |  |  | 5 |  |  |  |  |
|  | Plysurf A-210D |  |  |  |  |  | 5 |  |  |  |
|  | Plysurf AL |  |  |  |  |  |  | 5 |  |  |
|  | Pitzcol K-30L |  |  |  |  |  |  |  | 5 |  |
|  | Noigen TDS-80 |  |  |  |  |  |  |  |  | 5 |
| Organic Solvent | Diethylene glycol diethyl ether | 95 | 90 | 85 | 99 | 95 | 95 | 95 | 95 | 95 |
| Evaluation Results | Water resistance | AA | AA | A | B | B | B | B | C | C |
|  | Gloss | AA | AA | A | A | B | B | B | C | C |

According to the results shown in Table 1, since the peeling, particularization, and dispersion treatments were performed in diethylene glycol diethyl ether to which a phosphorous surfactant (Plysurf M-208B) was added to have a concentration of 5 mass percent, superior water resistance and gloss were imparted to the aluminum pigment dispersion A of Example 1.

Since the peeling, particularization, and dispersion treatments were performed in diethylene glycol diethyl ether to which a phosphorous surfactant (Plysurf M-208B) was added to have a concentration of 10 mass percent, superior water resistance and gloss were imparted to the aluminum pigment dispersion B of Example 2.

Since the peeling, particularization, and dispersion treatments were performed in diethylene glycol diethyl ether to which a phosphorous surfactant (Plysurf M-208B) was added to have a concentration of 15 mass percent, the water resistance and the gloss were imparted to the aluminum pigment dispersion C of Example 3. However, it was found that compared to the aluminum pigment dispersions A and B, the aluminum pigment dispersion C was slightly inferior in terms of the water resistance and the gloss.

Since the peeling, particularization, and dispersion treatments were performed in diethylene glycol diethyl ether to which a phosphorous surfactant (Plysurf M-208B) was added to have a concentration of 1 mass percent, the water resistance and the gloss were imparted to the aluminum pigment dispersion D of Example 4. However, it was found that compared to the aluminum pigment dispersions A and B, the aluminum pigment dispersion D was particularly inferior in terms of the water resistance.

Since the peeling, particularization, and dispersion treatments were performed in diethylene glycol diethyl ether to which a phosphorous surfactant (Plysurf A-208B) was added to have a concentration of 5 mass percent, the water resistance and the gloss were imparted to the aluminum pigment dispersion E of Example 5. However, it was found that compared to the aluminum pigment dispersion A, the aluminum pigment dispersion E was inferior in terms of the water resistance and the gloss.

Since the peeling, particularization, and dispersion treatments were performed in diethylene glycol diethyl ether to which a phosphorous surfactant (Plysurf A-210D) was added to have a concentration of 5 mass percent, the water resistance and the gloss were imparted to the aluminum pigment dispersion F of Example 6. However, it was found that compared to the aluminum pigment dispersion A, the aluminum pigment dispersion F was inferior in terms of the water resistance and the gloss.

Since the peeling, particularization, and dispersion treatments were performed in diethylene glycol diethyl ether to which a phosphorous surfactant (Plysurf AL) was added to have a concentration of 5 mass percent, the water resistance and the gloss were imparted to the aluminum pigment dispersion G of Example 7. However, it was found that compared to the aluminum pigment dispersion A, the aluminum pigment dispersion G was inferior in terms of the water resistance and the gloss.

Although the peeling, particularization, and dispersion treatments were performed in diethylene glycol diethyl ether to which polyvinylpyrrolidone (Pitzcol K-30L) was added to have a concentration of 5 mass percent, the water resistance and the gloss were not imparted at all to the aluminum pigment dispersion H of Comparative Example 1.

Although the peeling, particularization, and dispersion treatments were performed in diethylene glycol diethyl ether to which polyoxyethylene isotridecyl ether (Noigen TDS-80) was added to have a concentration of 5 mass percent, the water resistance and the gloss were not imparted at all to the aluminum pigment dispersion I of Comparative Example 2.

According to the results described above, it was found that when the peeling, particularization, and dispersion treatments are performed in diethylene glycol diethyl ether to which a phosphorous surfactant is added, the water resistance and the gloss can be imparted to the aluminum pigment. In addition, it was also found that the ability of imparting the water resistance and the gloss to the aluminum pigment changes in accordance with the type of phosphorous surfactant and the concentration thereof. In particular, it was found that when the peeling, particularization, and dispersion treatments are performed in diethylene glycol diethyl ether to which polyoxyethylene lauryl ether phosphate monoethanolamine (Plysurf M-208B) was added to have a concentration in the range of 5 to 10 mass percent, superior water resistance and gloss can be imparted to the aluminum pigment.

What is claimed is:

1. A method for manufacturing a water resistant aluminum pigment dispersion comprising the steps of:
   (a) forming a composite pigment base by sequentially laminating a peeling resin layer and an aluminum layer on a sheet-shaped substrate;
   (b) forming a composite pigment by peeling the sheet-shaped substrate from the composite pigment base;
   (c) forming an aluminum pigment dispersion by pulverizing the composite pigment, and
   (d) forming an aqueous composition that incorporates the pulverized composite pigment;
   wherein at least one of the steps (b) and (c) is performed in a composition comprising an organic solvent to which a phosphorous surfactant is added to impart water resistance to the composite pigment so as to inhibit whitening of the composite pigment when it is incorporated into the aqueous composition in step (d), wherein the aqueous composition includes the composite pigment in the form of plate-shaped particles and wherein, when a long diameter, a short diameter, and a thickness of a plain surface of each of the plate-shaped particles are represented by X, Y, and Z, respectively, a 50% average particle diameter R50 of a corresponding circle which is obtained by calculation from areas of X-Y plain surfaces of the plate-shaped particles is in the range of 0.75 to 2 µm, and R50/Z>5 is satisfied; and wherein the water resistant aluminum pigment dispersion is suitable for inkjet printing.

2. The method for manufacturing a water resistant aluminum pigment dispersion according to claim 1, wherein at least one of the steps (b) and (c) comprises performing an ultrasonic treatment in the organic solvent to which a phosphorous surfactant is added.

3. The method for manufacturing a water resistant aluminum pigment dispersion according to claim 1, wherein at least one of the steps (b) and (c) comprises immersing at least one of the composite pigment base and the composite pigment in the organic solvent to which a phosphorous surfactant is added.

4. The method for manufacturing a water resistant aluminum pigment dispersion according to claim 1, wherein the organic solvent is diethylene glycol ether or triethylene glycol monobutyl ether.

5. The method according to claim 1, wherein the composite pigment is not dispersed in water until after it is imparted with water resistance.

6. The method according to claim 1, wherein the composition in which the at least one of steps (b) and (c) is performed consists essentially of an organic solvent.

7. The method for manufacturing a water resistant aluminum pigment dispersion according to claim 1, wherein the concentration of the phosphorous surfactant in the organic solvent is 1 to 15 mass percent.

8. The method for manufacturing a water resistant aluminum pigment dispersion according to claim 7, wherein the concentration of the phosphorus surfactant in the organic solvent is 1 to 10 mass percent.

9. The method for manufacturing a water resistant aluminum pigment dispersion according to claim 1, wherein the phosphorous surfactant is a phosphate anionic surfactant.

10. The method for manufacturing a water resistant aluminum pigment dispersion according to claim 9, wherein the concentration of the phosphorus surfactant in the organic solvent is 1 to 10 mass percent.

11. The method for manufacturing a water resistant aluminum pigment dispersion according to claim 10, wherein the organic solvent is diethylene glycol diethyl ether.

12. The method for manufacturing a water resistant aluminum pigment dispersion according to claim 10, wherein the organic solvent is diethylene glycol diethyl ether or triethylene glycol monobutyl ether.

13. The method for manufacturing a water resistant aluminum pigment dispersion according to claim 12, wherein the phosphorous surfactant is polyoxyethylene lauryl ether phosphate monoethanolamine.

14. A method for manufacturing a water resistant aluminum pigment dispersion comprising the steps of:
   (a) forming a composite pigment base by sequentially laminating a peeling resin layer and an aluminum layer on a sheet-shaped substrate;
   (b) forming a composite pigment by peeling the sheet-shaped substrate from the composite pigment base;
   (c) forming an aluminum pigment dispersion by pulverizing the composite pigment, and (d) forming an aqueous composition that incorporates the pulverized composite pigment;

wherein at least one of the steps (b) and (c) is performed in a composition comprising an organic solvent to which a phosphorous surfactant is added to impart water resistance to the composite pigment so as to inhibit whitening of the composite pigment when it is incorporated into the aqueous composition in step (d), wherein the concentration of the phosphorus surfactant in the organic solvent is 1 to 10 mass percent, wherein the organic solvent is diethylene glycol diethyl ether or triethylene glycol monobutyl ether and wherein the phosphorous surfactant is polyoxyethylene lauryl ether phosphate monoethanolamine.

* * * * *